C. KUSCH.
FLEXIBLE SAW FRAME.
APPLICATION FILED DEC. 2, 1908.
931,435.
Patented Aug. 17, 1909.
2 SHEETS—SHEET 1.
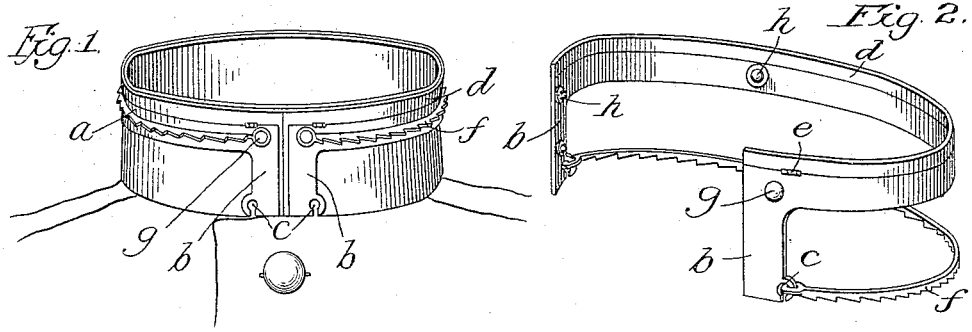
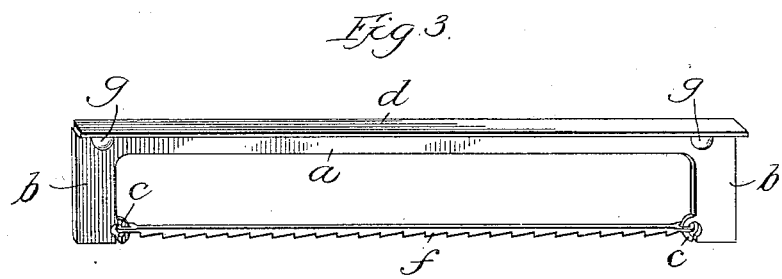
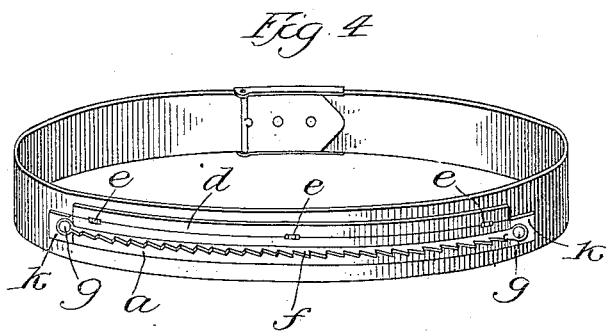
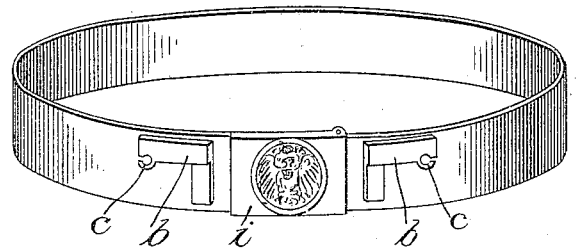
Witnesses:
Ed. Stern
E. Schallinger
Inventor:
Carl Kusch,
By B. Singer Atty.

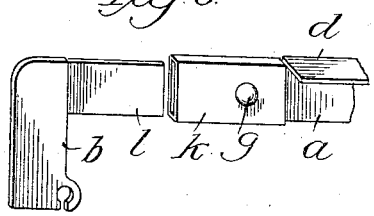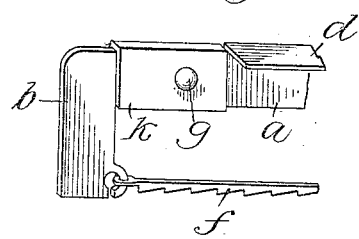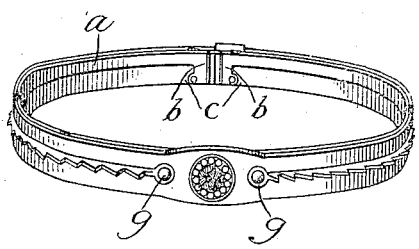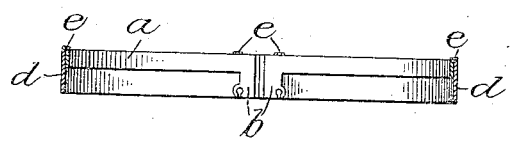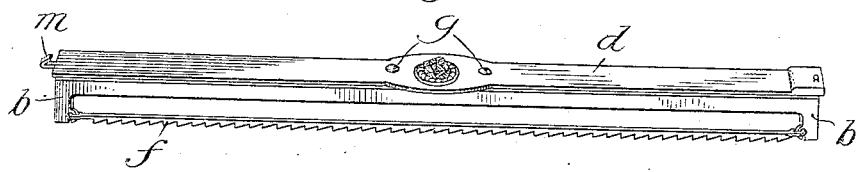

UNITED STATES PATENT OFFICE.

CARL KUSCH, OF CLARENKRAUST, NEAR BRESLAU, GERMANY.

FLEXIBLE SAW-FRAME.

No. 931,435.   Specification of Letters Patent.   Patented Aug. 17, 1909.

Application filed December 2, 1908. Serial No. 465,696.

*To all whom it may concern:*

Be it known that I, CARL KUSCH, a subject of the Emperor of Germany, residing at Clarenkraust, near Breslau, Germany, have invented certain new and useful Improvements in Flexible Saw-Frames, of which the following is a specification.

This invention relates to a saw which can be worn on the dress or on the person and is also provided with a frame adapted to serve as a guard.

The invention consists in a flexible saw frame convertible at any time by suitable means into a rigid frame and which is so constructed that the saw blade can be put into the frame in the known manner, when the saw is used as a tool, or be fixed to the flat side of the frame when the frame is used as a guard. In the latter case the frame of the saw protects the dress or the body from contact with the saw blade.

In order that the saw frame may be quickly and conveniently made rigid, it is advisable that a flat and flexible band be linked to the frame. If this band lie in the same plane as the frame it will in no way impair the flexibility of the frame. If, however, it be turned to the extent of 90°, so as to form a right angle with the frame, the frame will deprive the band of its flexibility and the band acts similarly with regard to the frame, so that thereby a rigid saw frame is produced. The flexibility of the frame enables the device to be adapted in any desired manner to the dress or to the body.

In the drawing various forms of the new device are illustrated.

Figures 1, 2, 3, 4, 5, 8 and 10 are perspective views of the device in different positions. Figs. 6 and 7 are detailed views of the ends of my device. Fig. 9 is a cross section.

In the form of the invention shown in Figs. 1 to 3 the novel saw is constructed so that it can be worn on a uniform collar and in this case forms a substitute for the lace or galloon worn by non-commissioned officers. The frame of the saw consists of a narrow steel band $a$ with the vertically bent down frame ends $b$. The latter are provided with hooks $c$ for putting in the saw blade. On the steel band $a$ a second steel band $d$ is pivoted by means of the hinges $e$ besides which studs $g$ are provided on the steel band $a$ for fixing the saw blade $f$ to the steel band $a$ as shown in Fig. 1. Thus the teeth of the saw blade $f$ stand perpendicularly to the steel band $a$ and in this form serve as a guard for the neck. The attachment of the steel band $a$ to the uniform collar is effected for example by means of spring eyelets $h$. If the saw be used as a tool, the frame $a$ is released from the collar and the saw blade $f$ detached from the studs $g$ and put in the hooks $c$ in the arms or ends $b$ (Fig. 2). The steel band $a$ is then straightened and the steel band $d$ turned over as shown in Fig. 3 whereby the steel band $a$ with the vertically bent down ends $b$ forms a straight rigid saw frame. If the saw blade $f$ be made slightly shorter than the bare width of the saw frame when the band or bar $d$ is tipped over the saw blade $f$ will be placed under considerable tension.

In the form of the invention shown in Figs. 4 to 7 the saw is arranged on a waist belt. In order that it may also be possible to put the device on narrow waist belts, without parts of the same projecting above the belt, the ends $b$ of the frame are detachably connected with the band $a$. The fixing of the parts of the frame to the waist belt is effected preferably by means of stud and eyelet fastenings. The steel band $a$ is suitably fixed to the back of the waist belt (Fig. 4), while the parts $b$ can be arranged adjacently to the device $i$ for fastening the waist belt (Fig. 5). The fastening of the saw blade $f$ to the band $a$ is effected, as in the example shown in Figs. 1 to 3 by means of the studs $g$ and the connection of the band $a$ with the band $d$ is effected in the manner previously described. The ends $k$ of the band $a$ are however, made hollow, so that the parts $b$ of the frame may be fixed therein by means of the pins $l$. It is not necessary that the parts $b$ and $a$ should be fastened together specially as these parts are held together by the putting in of the saw blade.

In the form of the invention illustrated in Figs. 8 to 10 the novel device is in the form of an armlet. In this case the band $a$ forms the armlet, which can be fastened in any suitable manner, for example by means of a hook fastening $m$. The saw blade $f$ is fastened on the outside of the armlet by means of the studs $g$ and thereby forms a guard for the arm. When the armlet is fastened the saw frame $a$ lies on the inside thereof as shown in Fig. 8 and Fig. 9. If the saw is intended to be used, in this case, as a tool also, the armlet is loosened, the saw blade removed, and put in between the arms $b$ and the steel band $d$ straightened and turned over at an angle of 90° in relation to the frame, as shown in Fig. 10. The band $d$ which serves for making the flexible saw frame $a$ rigid can be held in its position perpendicularly to the saw frame by some suitable means not shown in the drawing.

The employment of the flexible steel band as a saw frame of course enables the device to be adapted in any other desired way to the dress or to the body, and as is seen from the examples given, the device can be used not only as a tool and as a guard but likewise as an ornament.

What I claim and desire to secure by Letters Patent is:

1. In combination, a flexible saw frame, a flexible saw blade, and means connected with said frame for rendering said frame rigid, substantially as and for the purpose set forth.

2. In combination, a flexible saw frame, a flexible saw blade, means connected with said frame for rendering said frame rigid and means for securing said blade to said frame when said frame is in flexible condition and when said frame is in rigid condition.

3. A flexible saw frame adapted to be convertible into a rigid frame, a flexible band saw hinged to said frame and adapted to be adjusted in a plane at right angles to said saw frame to impart lateral rigidity.

In testimony whereof I have affixed my signature, in presence of two witnesses.

CARL KUSCH.

Witnesses:
ERNST KATZ,
BRUNO HÖHLMER.